United States Patent [19]

Schiwek

[11] Patent Number: 5,688,074
[45] Date of Patent: Nov. 18, 1997

[54] OIL BARRIER

[76] Inventor: Helmut Schiwek, Am Waldessaum 3, D-47057 Duisburg, Germany

[21] Appl. No.: 495,478
[22] PCT Filed: Jan. 8, 1994
[86] PCT No.: PCT/DE94/00008
§ 371 Date: Jul. 24, 1995
§ 102(e) Date: Jul. 24, 1995
[87] PCT Pub. No.: WO94/17249
PCT Pub. Date: Aug. 4, 1994

[30] Foreign Application Priority Data

Jan. 23, 1993 [DE] Germany ............ 43 01 791.6
Jul. 31, 1993 [DE] Germany ............ 43 25 806.9

[51] Int. Cl.⁶ .................................. E02B 15/04
[52] U.S. Cl. ................... 405/63; 405/66; 405/67; 210/242.4; 210/924
[58] Field of Search .......... 405/63, 64, 65, 405/66, 67, 68, 69, 70, 71, 72, 73, 60; 210/242.3, 923, 242.4, 922, 924

[56] References Cited

U.S. PATENT DOCUMENTS

| 3,981,100 | 9/1976 | Weaver et al. ............ 47/58 |
| 5,071,545 | 12/1991 | Ashtary ............ 405/63 X |
| 5,165,821 | 11/1992 | Fischer et al. ............ 405/63 |
| 5,186,831 | 2/1993 | De Petris ............ 210/924 X |
| 5,215,407 | 6/1993 | Brelsford ............ 405/63 |
| 5,466,379 | 11/1995 | Schiwek ............ 210/242.4 X |
| 5,468,536 | 11/1995 | Whitcomb et al. ............ 428/98 |

FOREIGN PATENT DOCUMENTS

| 470555 | 9/1974 | Australia ............ 405/68 |
| A2111239 | 6/1972 | France . |
| A2466517 | 4/1981 | France . |
| A2646189 | 10/1990 | France . |
| A1634197 | 3/1971 | Germany . |
| C4140247 | 12/1992 | Germany . |
| A1235463 | 6/1971 | United Kingdom . |
| 2250720 | 6/1992 | United Kingdom ............ 405/60 |
| WOA8300710 | 3/1983 | WIPO . |

OTHER PUBLICATIONS

Ocean Industry, "Pollution Control Report", pp. 46–61, Jun. 1970.

Primary Examiner—Tamara L. Graysay
Assistant Examiner—Tara L. Mayo
Attorney, Agent, or Firm—James Creighton Wray

[57] ABSTRACT

In order to control oil accidents and to prevent the oil film drifting on the water from spreading, an oil adsorber 1 is provided, in particular shaped as a barrier 2. This barrier 2 is designed in two parts. Both cells 9, 10 are completely filled with glass fiber material or with corresponding fiber mats 11, 12. The glass fibers 28, 30 of the top cell 9 are waterproofed, by an appropriate coating, whereas the fibers of the bottom cell 10 are not treated, so that they absorb water 6. In both cases epoxy resin or a synthetic resin having the same or similar properties are used, so that a long service life is achieved with optimum solidity and design possibilities. The oil adsorbers 1 thus obtained may be used both as barriers 2 and as flat suction elements, for example to clear bilge waters from ships 3. It is also conceivable to use the flat or funnel-shaped elements for collecting components of an aqueous solution, for example.

20 Claims, 3 Drawing Sheets

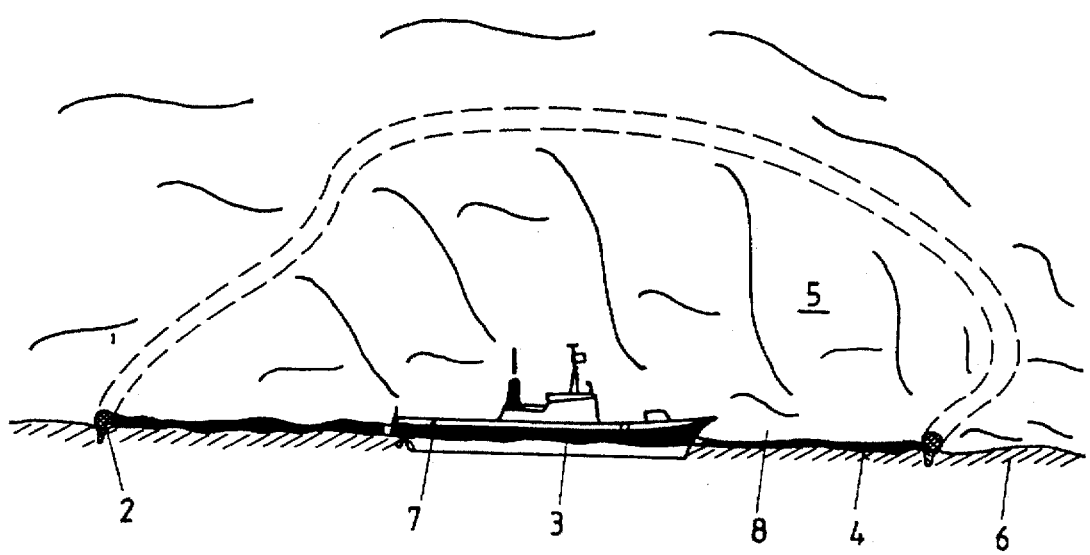
Fig.1
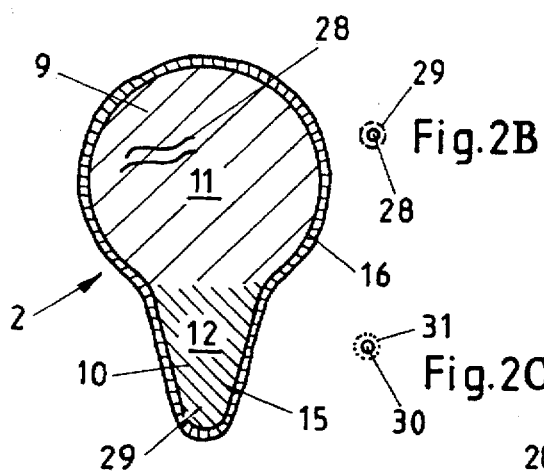
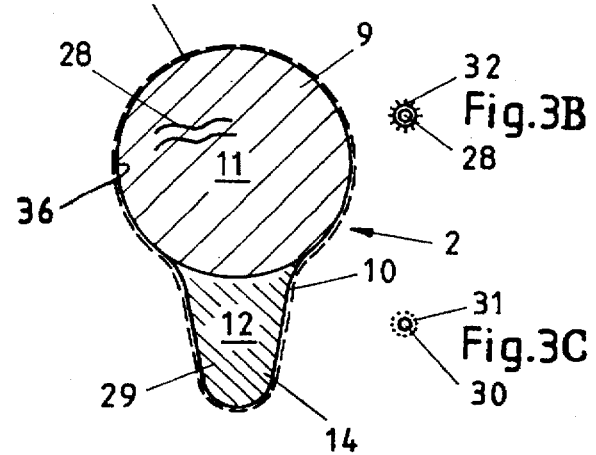

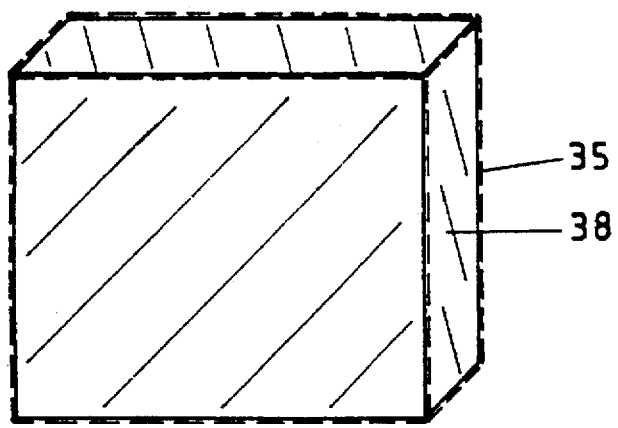
Fig. 5
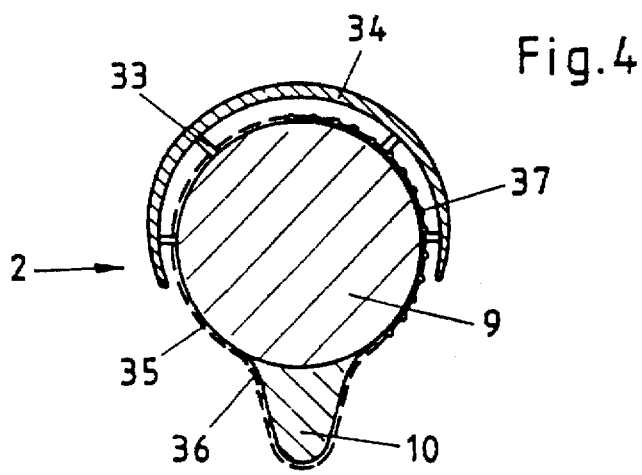
Fig. 4
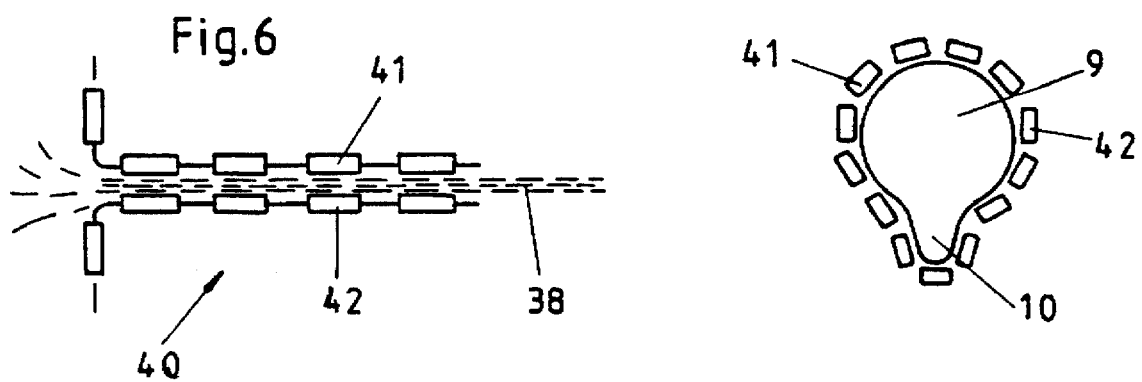
Fig. 6
Fig. 7

OIL BARRIER

BACKGROUND OF THE INVENTION

The invention relates to an oil barrier according to the preamble of the claim.

With oil transporters becoming steadily larger, the environmental risk due to leaking oil also becomes steadily higher. In oil disasters during the past years, entire coastal areas have been highly contaminated, and life in the sea below the threatened areas has been completely annihilated. For this reason, attempts were made—e.g. during the Gulf war—to prevent the leaked oil offshore, especially of the shore of Saudi Arabia, from spreading and to readsorb it by suitable means. According to French Patent 2 646 189, attempts were made, to blow mineral fibers which were made hydrophobic onto the water surface. Oil was supposed to attach to these fibers, so that they could then be more easily collected and disposed as a mass. The fibers are made hydrophobic with silicone oil, whereby as a result of the short fibers a sinking of these fibers cannot be prevented, so that the sea bottom is still contaminated and soiled. British Patent 1 235 463 introduces a process in which the oil floating on the water is adsorbed by inorganic fibers, whereby the fibers have been previously provided with a hydrophobic material. The fibers thus float on the oil and attach the oil, which is then removed by burning off the fibers. Not considering the fact that the simple burning of the oil adsorbed by the fibers is not economically justifiable, the burning of the oil itself causes a significant environmental burden. In addition, the storage capacity of the inorganic fibers simply sprayed and placed onto the water surface is minimal, so that only small amounts of oil can be adsorbed from the water safely and only for a short period. A particular disadvantage is that in all of these prior art solutions, the fibers are placed loosely on the water surface, so that it is usually not even possible to prevent the oil spill from spreading further once it has leaked or occurred. For this purpose, German Patent 41 40 247 suggests that from glass wool materials which were made hydrophobic, a barrier is formed by placing these glass fibers into a perforated tube. The oil is able to enter the tube and the glass wool through the perforation, where it is bound accordingly and is stored until the barrier is removed from the water and is disposed. The disadvantage here is that this oil adsorber or the corresponding barrier floats on the top of the water surface, so that it cannot be prevented that oil exits below the barrier into the area beyond the barrier during waves. In FRA-2 111 239 an oil barrier having two parts is shown, in which the foam material substance floating on the water is water-proof or hydrophobic. The upper area consequently cannot absorb either water or oil, nor any substance similar to oil. It acts in the swimming position while stabilized by the water porous foam material part, exclusively as a barrier, which for example, prevents the oil from expanding over a surface area. The lower part which is submerged in the water can—if at all—absorb only limited amounts of water due to the foam. Even though its volume is substantially greater than that of the upper part, it is not suited, particularly in the event of high waves as a stabilizing keel.

SUMMARY OF THE INVENTION

The invention is thus based on the objective of creating an oil adsorber which can be easily placed on and removed from the water, which also lies in the water safely during high waves, and is not penetrable by oil, and which furthermore is easy to produce and work with.

The objective of the invention is realized in accordance with the invention characteristics contained in claim 1.

This design has the unexpected effect that the oil barrier places itself always in the same shape on the water surface, since the fiber mats very quickly take up so much water in the lower part that this quickly and surely creates a keel which thus ensures an accurate position of the barrier. Because of the precise and secured keel position the oil spill is unable to penetrate below the barrier, even in high waves, and the always identical and safe position of the oil barrier also has the result that the oil does not spill over it. The hydrophobically equipped fiber mats arranged in the upper part or the corresponding cell ensure that the present oil is safely and within a short time frame stored and the oil barrier, consequently achieves better floatation. The storage achieves the additional effect that the buoyancy of the barrier is increased.

The two parts are formed as cells and with respect to volume are differently proportioned. This form ensures, that the oil adsorber always floats on top of the water, whereby the cell resting in the water together with the non-hydrophilic fiber mats creates an advantageously stabilizing effect and thereby prevents the penetration of oil. For this purpose it is useful that the cell is designed as a nose-shaped attachment, so that the two parts can be manufactured separately and can then be assembled. Other designs, such as the linking of the cells via a bridge are also conceivable. The fiber mats furnish a high tensile strength, so that the barrier being advantageously taut, can be hauled in, particularly after use, without the oil being prematurely squeezed out in the course of the compression of the barrier.

Another useful embodiment provides that the glass fibers of the fiber mats are coated with a binder (hydrophobic) consisting of an epoxy and/or methylon or polyester resin, hardener, methylpolysiloxane, or silicone methyl resin and dust-collecting agent or a binder (hydrophilic) consisting of the fiber mat with an epoxy and/or methylon or polyester resin, hardener, and dust-collecting agent, which was previously mixed into an emulsion or is sprayed as a single or multiple component agent onto the fibers, i.e. separately on the fiber mats of the upper or lower cell. An appropriate preparation and design of the binder makes it possible for the individual fibers which have been combined into mats or molded bodies to be provided with high stability and adequate flexibility. They can be used several times, in particular also because the use of the epoxy resin ensures an almost unlimited service life. If so required, the individual barrier can be disposed on the ship or can be brought on land and can be disposed there, whereupon it can be reused. It is hereby harmless, if small amounts of oil remain in the barrier, since this oil promotes buoyancy, rather than having negative effects. The described coating and the corresponding binder also have the advantage that they are resistant to a very high number of materials and are provided with excellent adhesion qualities in regard to glass. In this manner a binder can be obtained which can be rapidly applied and processed, form a glass fiber lattice mat with high stability, and which is particularly suitable for the measures considered here, which pose a high burden on the lattice mat.

It is advantageous for the materials usually employed for this purpose that the glass fibers are coated with 6 to 9 wt. % epoxy or methylon resin, 0.5 to 4 wt. % silicone resin, and, as known, a small amount of dust-collecting agent. The appropriate amounts, especially those of epoxy resin, in particular may approach or reach the upper limit, if a corresponding stiffness is not supposed to be achieved with epoxy resin and the volume density, but only through the type of epoxy resin as such, and thus with low volume densities. The epoxy resin has the advantage that it can be processed at relatively low temperatures, so that processing temperatures of 20° to 30° are sufficient. Depending on the desired stiffness of the fiber mats, it is in particular possible to increase the epoxy resin content, as already mentioned.

To increase tensile strength, but also in order to provide the barrier with a specific shape, it is advantageous if the cell of the barrier immersed in the water is formed by a nose-shaped constriction, whereby both cells are surrounded by a perforated tube or thin glass fleece or similar mantle. This enables a favorable shape and at the same time specifically achieves a certain wedge shape for the cell immersed in the water.

The possibility of producing a binder from different resins has been mentioned above. But it would also be conceivable that the fiber mat for the large-volume cell is produced from glass fibers with a thickness of approximately 3 µm, whereby a long-chained starch with silicone additions functions as binder, and whereby the fiber mats of the water-immersed cell have a volume density of approximately 80 kg/m$^3$. The starch is made hydrophobic with silicone additions, while acting itself as an advantageous binder which is made water-insoluble by the silicone additions and subsequent heat treatment. This results in a fiber which, with appropriate coating, can be combined into fiber mats which practically may have any desired density, whereby it is then useful that these mats are then rolled up in such a way that they result in a round fiber strand. The oil or similar substances then attach to this fiber, so that an oil adsorber constructed accordingly takes up large amounts of such substances and, as already mentioned before, does not permit them to pass in any way. Also conceivable would be mixtures of silicone resins and latex or similar components for replacing the starch in this way, if this is found to be advantageous. Latex is also made water-insoluble in this manner. It is useful that for the water-immersed cell a material is used, in which the fibers of the fiber mats for the water-immersed cell are coated with a water-insoluble binder. This binder here may be even hydrophilic, so that it even stores water, thus achieving the desired effect of a safeguarding shield for the oil barrier that is even faster and safer.

In order to ensure easy handling, the invention provides that the oil barrier is provided with holders shaped so as to facilitate the installation work and removal, and so as to correspond to holders arranged on the outboard side of the ships. The holders arranged on the outboard side of the ships hereby may be trough-shaped, so that the oil barrier is simply placed into it, or they are actually fixed, whereby the special design of the oil barrier ensures that the oil, once it has been adsorbed by the oil barrier, is effectively retained until the barrier is disposed on land or shipboard. It is advantageous that the oil barrier which is filled with oil is unable to soil the ship, since the oil is retained in the barrier.

For use at sea, where wind and waves cause especially high strains, a particularly suitable oil adsorber is provided in which more than two, preferably four, cells with a diameter decreasing towards the bottom are connected movably with each other so as to form a barrier, whereby the cells forming the storage cell and a wedge-shaped cell provided as a tow shield forming the guide cell, are combined. This design results in an overall construction with optimal adaptation to the wave movements, which prevents a "lapping over" of the oil in this manner. The bottom cells which hang into the water are filled with hydrophilic material, thus acting as a keel, whereby it would also be conceivable, however, that alternating fillings are provided so that oil floating below the water surface still can be adsorbed safely. The advantage hereby is that such a construction creates an overall stabile total construction which still can be placed well on the water and which can be safely handled using standard auxiliary equipment.

In order to be able to withstand higher stresses even during storms and still enable a maneuvering of the oil barrier, the invention provides that between the individual cells a tow cable constructed as fiberglass cable is arranged, preferably integrated into the overall structure. The integration prevents that individual parts of the oil barrier are torn off. Rather, all parts, i.e. all cells, hang on the tow cable, so that even high wind speeds will not affect it negatively. It is naturally also conceivable that one or more of these tow cables are attached to the outside of individual cells, whereby the cables possibly can be integrated into the tissue surrounding the cells. The construction as a fiberglass cable has the advantage that the cable then can be disposed together with the entire oil barrier, e.g. by melting them.

It has already been mentioned above that the use of long-chained starch and silicone resin also can be advantageous, whereby the silicone resin is easily processed. The advantage here is that the corresponding binder consisting of the long-chained starch and silicone resin is added in amounts from 6 to 8% (94 to 96% starch and 4 to 6% silicone or silicone resin). The relatively high starch and silicone content of the binder ensures that all fibers are adequately coated, so that neither nests nor areas in which the binding is insufficient form. Especially for the intended use, an effective binding of the individual fibers to each other is important, on the one hand for ensuring the necessary adsorption volume, on the other hand for a better absorption of the high tensile forces.

The invention is characterized by the creation of an oil adsorber which is versatile and in particular which can be reused several times. The oil barrier is easily produced and, as a result of its composition of glass fibers, through the mantle and its design as such, has a high tensile strength, so that barriers that are accordingly long and heavy as a result of the oil adsorption can be handled. The individual cells of the oil barrier are equipped with fiber material which is on the one hand made hydrophobic and on the other hand hydrophilic, whereby primarily epoxy resin with hardener is used for the hydrophilic part of the barrier. This material also contributes to the fact that barriers made from it have a high tensile strength and can be used very well and for several times. The barriers overall also do not pose any problems in respect to disposal, since they can be easily melted. This makes it possible to recycle the barrier. This is also true if a tow cable is integrated into the barrier, since the former consists also of glass fibers. In addition, such a tow cable has enormously high tensile forces. But in particular, a construction of the oil barrier in two or more cells prevents a penetration by oil due to waves. This applies both to the above-water and underwater part which may have a special shape so that the oil penetration is made even harder.

Other details and advantages of the subject of the invention result from the following description of the associated drawing, which shows a preferred embodiment with the necessary details and parts. In the drawing:

BRIEF DESCRIPTION OF THE DRAWINGS

FIG. 1 shows a ship from which oil has leaked or which is supposed to take up the oil surrounded by a barrier;

FIG. 2A shows a section through the barrier with constriction;

FIGS. 2B and 2C are cross-sections of the respective fibers in the barrier;

FIG. 3A shows a section through the barrier with integrated attachment and corresponding mantle;

FIGS. 3B and 3C are cross-sections of the respective fibers in the barrier;

FIG. 4 shows a barrier with hood;

FIG. 5 shows a plate-like design of the barrier;

FIG. 6 shows an endless link band for shaping such a barrier, and

FIG. 7 shows a section through such an endless link band in order to clarify the corresponding shaping of the barrier;

DETAILED DESCRIPTION OF THE PREFERRED EMBODIMENTS

Figure 8:
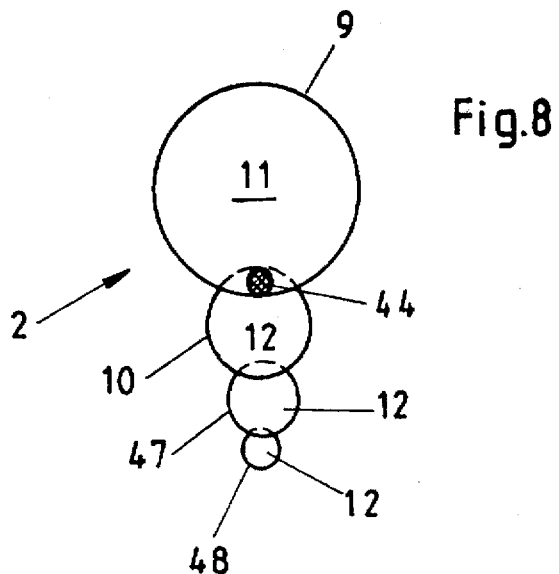
FIG. 8 shows a section through an oil barrier with a multi-part sinking part.

FIG. 1 shows a ring-shaped oil adsorber which is placed in the form of a barrier 2 around a ship 3 which drives or is stationary inside an oil puddle or oil spill 5 on the water surface 4, e.g. in order to reabsorb the floating oil. This may also be the ship in distress, except that it would have to be constructed as an oil tanker. Since this is a kind of section and perspective view, it can be seen that an accordingly thick oil layer 8 is located on the water 6 or water surface 4.

The ship 3 has on the outboard side holders 7, in which the oil adsorber 2 can be stored when sailing. This makes it possible in the case of oil tankers, for example, to place this oil adsorber quickly onto the water surface 4 when problems occur, in order to prevent a spreading of such an oil puddle or oil spill 5 from the start.

FIGS. 2A and 3A show in more detail that the oil adsorber or the barrier 2 has several cells. The larger cell 9 is filled with a fiber mat 11 which consists of hydrophobically equipped glass fibers 28. in FIG. 2B the glass fibers 28 are here coated, e.g. with epoxy resin, hardener, silicone resin, and dust-collecting agent, so that they are not able to absorb water, but are able to adsorb and store oil, for example, so that this barrier 2 simultaneously fulfills a multiple function.

The cell 10 with the smaller volume is filled with a fiber mat 12 which has not been hydrophobically equipped, which is designated with a different striation. This smaller cell and its shape result in a kind of shield below the actual oil adsorber 1, which makes it harder or impossible for oil to pass under it and which simultaneously ensures that the barrier always floats on the water 6 in the illustrated shape, without twisting and thus becoming possibly ineffective.

According to FIG. 3, a nose-shaped attachment 14 is provided. The figure shows in more detail that it actually consists of two parts which have been combined into one unit by gluing the outer mantle of the cell 10 to the cell 9. A holder or reinforcement is not required, since the glass fibers 28 which have been made hydrophobic with the already mentioned binder 29 form such a strong frame that high tensile forces can be absorbed. In addition, the outside wall 36 is provided with a glass fleece 35 which additionally increases the tensile strength significantly.

While according to FIG. 3 the nose-shaped attachment 14 is provided, which reflects a two-part unit, FIG. 2 shows a one-part oil adsorber 2. Here the perforated tube 16 which surrounds both the larger cell 9 and the constriction 15 determines the shape of the tube or oil adsorber in accordance with the respective application.

FIGS. 2B, 2C and FIGS. 3B, 3C clarify that the individual glass fibers 28 or 30 can be made hydrophobic with different binders 29 or 32. In the first case, epoxy resin is mixed with the silicone resin and other parts, while in the second case additional starch is used. Then glass fibers 30 in the smaller cell 10 are kept hydrophilic by not using silicone. The corresponding binder is designated with 31.

According to FIG. 4, the upper part is additionally provided with a hood 34 which is kept via spacers 33 at a distance to the actual outside wall 36, so that the gas which was automatically released can collect here. This increases the buoyancy. FIG. 4 furthermore shows the special design of the mantle 37, here in the form of glass fibers, so that the barrier 2 has over its entire length a very high tensile strength and thus can also be disposed easily, since it consists of the same material in its entirety, i.e. glass.

FIG. 5 shows a variation of this, in as far as the barrier is supposed to be formed here by many flat mats 38. The individual mats 38 are surrounded either individually or together by the mantle 37 or a glass fleece 35. This flat mat 38, in particular in the form of individual partial bodies, can be used especially to clear the bilge of ships, in that the mat is first simply thrown onto the water surface to adsorb the oil, and the oil is then removed by simply removing the mats 38.

FIG. 6 and 7 provide suggestions for how the mats 38 or round barriers 2 can be produced in a strand. The endless link band 40 consists of a number of individual links 41, 42 which are arranged and shaped according to FIG. 7 in such a way that an almost circular, long tube with a corresponding nose-shaped attachment is obtained. The individual links 41, 42, facing each other respectively are arranged movably, so that different volume densities can be produced.

FIG. 8 shows an oil barrier consisting of several, here a total of four, cells, i.e. cells 9, 10, 47, 48. It is shown that these cells 9, 10, 47, 48 are hooked or woven inside each other, so that the overall structure is able to advantageously move, while preventing the risk that oil or oil-like products are able to escape between the individual cells. Since the cells immersed in the water, i.e. at least cells 47 and 48, are filled with hydrophilic material, they advantageously act as a sink shield and ensure that the floating cell 11 is not able to lift off the water level.

Figure 9:
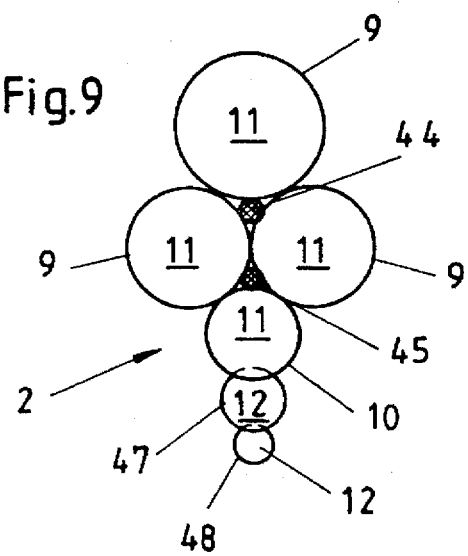
FIG. 9 shows a section through an oil barrier as in FIG. 8, with additional tow cable.

The same applies in principle for the design according to FIG. 9, whereby, as in FIG. 8, tow cables 44 are also integrated into the barrier 2. In addition, another tow cable 45 is provided, in order to make a pulling out of the water or lifting off from the water surface harder. For this purpose, it would be conceivable that the cell 48 would also be provided with such a tow cable. In contrast to the other designs, the floatable part here consists of at least three cells 9, while the cell 10 is also filled with hydrophilic or hydrophobic material, depending on which circumstances are expected in each case.

Figure 10:
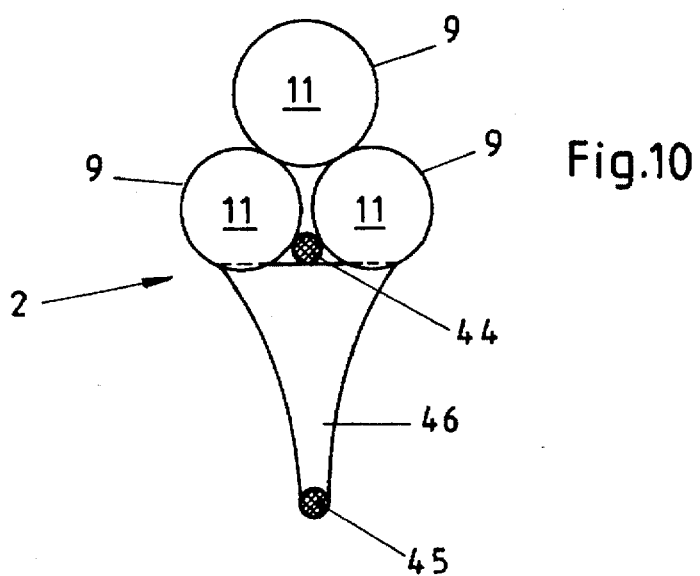
FIG. 10 shows a section through an oil barrier as in FIG. 9, with a tow shield.

The design according to FIG. 10 differs from that in FIG. 9 only in that instead of the cells 47, 48 which are movable relative to each other, here a single tow shield 46 is provided. In this design, another tow cable 45 is integrated into the bottom of this tow shield, thus additionally increasing the sink shield effect of this tow shield 46.

FIG. 10 shows the containment barrier 2 having first and second sections running adjacently along longitudinal axes of the sections. The first section has plural cells 9 forming storage cells. The second section has a wedge-shaped cell 46 forming a guide cell. The tow cable 45 is provided at an apex of the wedge-shaped cell. The guide cell 46 acts as a tow shield. FIG. 10 shows spaces between the plural cells 9 having a tow cable 44.

I claim:

1. A barrier for containing spills comprising an elongated fiber strand having at least two portions forming first and second portions along a length of the strand, the first portion comprising plural hydrophobic mats and the second portion comprising plural hydrophilic mats.

2. The barrier of claim 1, further comprising first cells forming the first portion and second cells forming the second portion, wherein the second portion is immersible in water and the first portion remains afloat, and further comprising a coating of water-insoluble binders on the hydrophilic mats, and wherein the hydrophilic mats have a volume of about 1/10 to 1/3 a volume of the first portion.

3. The barrier of claim 1, wherein the hydrophobic fiber mats are of glass fibers, said glass fibers having a hydrophobic binder coating, the binder comprising an emulsion selected from a group of substances comprising an epoxy material, methylon, polyester resin, hardener, methylpolysiloxane, silicone methyl resin and dust collecting agent.

4. The barrier of claim 3, wherein the emulsion is sprayed as a mixture of all the substances.

5. The barrier of claim 3, wherein the substances are sprayed either singly or as multiple components of at least two substances.

6. The barrier of claim 3, wherein the coating on the glass fibers comprises 6 to 9 wt. % epoxy or methylon resin, 0.5 to 4 wt. % silicone resin, and a dust-collecting agent.

7. The barrier of claim 1, wherein the hydrophilic fiber mats are of glass fibers, said glass fibers having a hydrophilic binder coating.

8. The barrier of claim 7, wherein the coating is formulated as a spray.

9. The barrier of claim 7, wherein the coating comprises single or multiple components of at least two substances, and wherein the coating is formulated as a spray.

10. The barrier of claim 7, wherein the coating on the glass fibers comprises 6 to 9 wt. % epoxy or methylon resin, 0.5 to 4 wt. % silicone resin, and a dust-collecting agent.

11. The barrier of claim 1, wherein the second portion is narrower than the first portion.

12. The barrier of claim 1, further comprising a mantle enclosing the first and second portions.

13. The barrier of claim 1, wherein the mats are made of glass fibers having a thickness of 3 µm.

14. The barrier of claim 13, wherein the fibers comprise binders of long-chained starch material with silicone, and wherein a volume density of the fibers is 80 kg/m$^3$.

15. The barrier of claim 14, wherein the fibers comprise 6 to 8% of binders, and wherein the binders comprise 94 to 96% starch and 4 to 6% silicone.

16. The barrier of claim 1, further comprising plural connectors for engaging plural holders on water-borne vessels said holders for receiving and holding the barrier on the vessels.

17. A containment barrier comprising first and second sections running adjacently along longitudinal axes of the sections to form the barrier, the first section comprising plural cells forming storage cells, the second section comprising a wedge-shaped cell forming a guide cell, and the barrier further comprising spaces between the plural cells, and at least one tow cable provided in a space between the cells.

18. The barrier of claim 17, wherein the guide cells form a tow shield.

19. The barrier of claim 17, wherein the at least one tow cable is a fiberglass cable.

20. The barrier of claim 17, further comprising a tow cable at an apex of the wedge-shaped cell.

* * * * *